May 28, 1929.   C. E. HUBBARD   1,715,293
SHAFT COUPLING
Filed Jan. 3, 1928   2 Sheets-Sheet 1
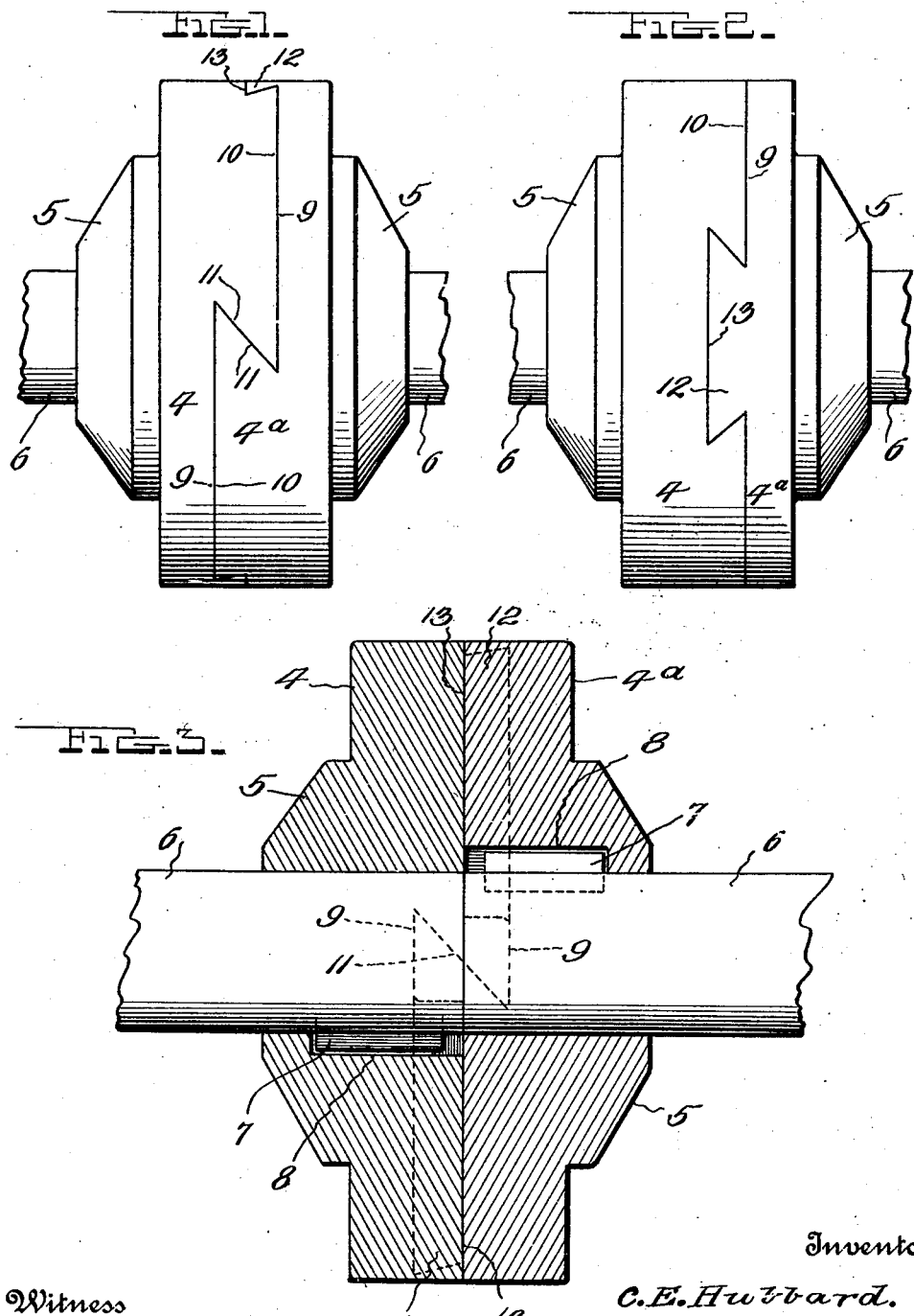

May 28, 1929.  C. E. HUBBARD  1,715,293
SHAFT COUPLING
Filed Jan. 3, 1928   2 Sheets-Sheet 2
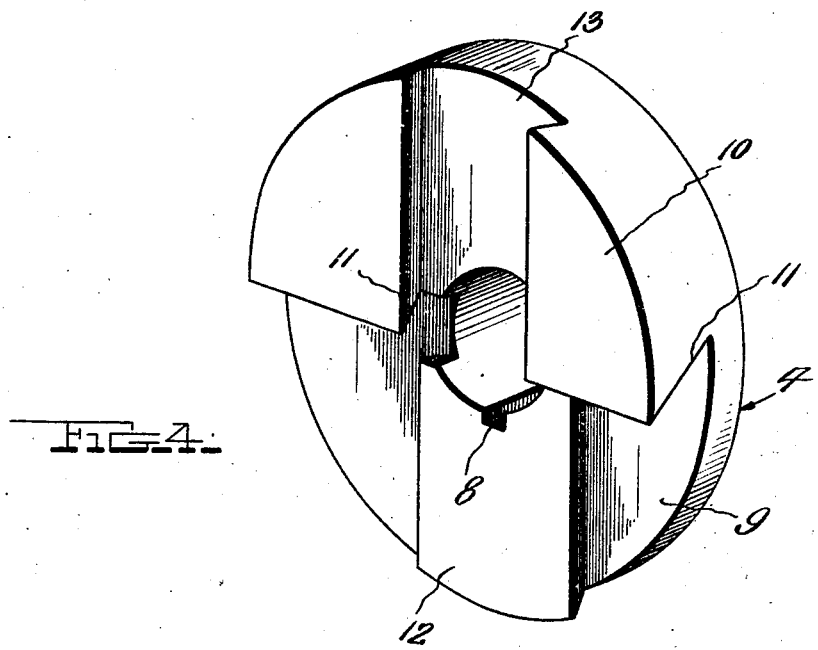
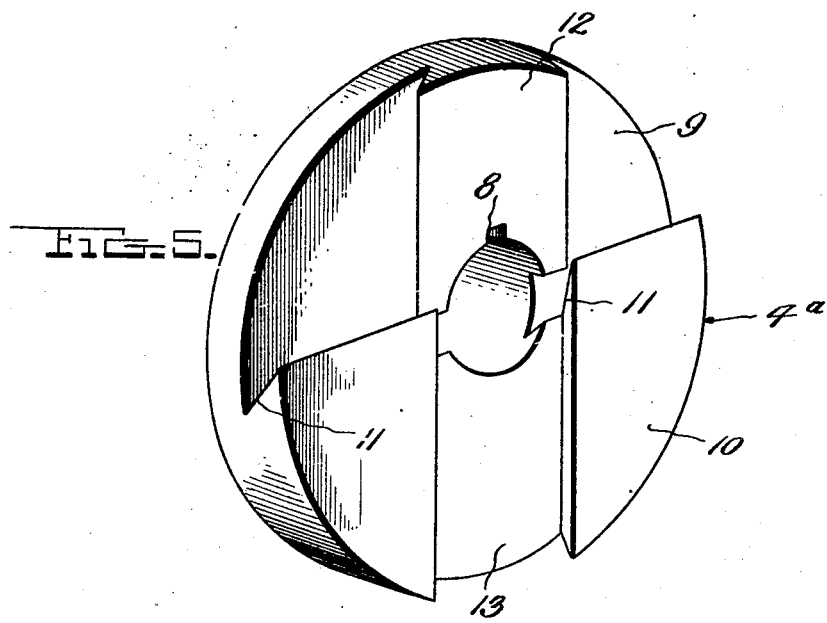

Patented May 28, 1929.

UNITED STATES PATENT OFFICE.

CHARLES E. HUBBARD, OF LONGVIEW, WASHINGTON.

SHAFT COUPLING.

Application filed January 3, 1928. Serial No. 244,236.

The invention aims to provide a new and improved form of coupling for effectively connecting two shafts without the necessity of using any projecting parts to catch in clothing or otherwise become hazardous, and without the use of bolts, set-screws, etc., the construction being such that the two coupling sections may be quickly and easily connected with each other or disconnected, as occasion may demand.

With the foregoing in view, the invention resides in the novel subject matter hereinafter described and claimed, description being accomplished by reference to the accompanying drawings.

Figs. 1 and 2 are edge views at right angles to each other.

Fig. 3 is a longitudinal sectional view.

Figs. 4 and 5 are perspective views of the two complementary coupling members.

In the drawings above briefly described, the numerals 4 and 4ª denote two shaft-carried disks, each preferably having a hub 5 in which the shafts 6 are disposed, appropriate keys 7 and co-acting keyways 8, being provided for establishing a driving connection between the hubs and the shafts.

One face of each disk is stepped, so that substantially half 9 of its area is disposed in one plane and substantially the other half 10 of said area is disposed in another, outwardly spaced plane, the two portions 9—10 constituting inner and outer steps which are connected by a step-connecting portion 11, which portion is at an acute angle to both of said steps. The inner step 9 is provided with a radially disposed dove-tail rib 12 integral therewith and the outer step 10 is formed with a dove-tail groove 13 alined with said rib, the outer face of the rib and the inner side of the groove, being disposed in a common plane, which plane is parallel with the steps 9—10 and of course at right angles to the axis of the disk.

When the two disks 4—4ª are assembled by relatively moving them diametrically, the rib 12 of each disk is received in the groove 13 of the other disk, the step 9 of each disk contacts with the step 10 of the other disk, and the step-connecting portions 11 of the two disks abut each other and interlock, as shown in Fig. 1. Hence, a positive driving connection is established between the two shafts 6, free from bolts, set-screws and the like and free also of any projections which might be hazardous, for instance, due to danger of catching in clothing. The two disks may obviously be disconnected from each other with ease, simply by shifting them in a diametrical direction, so that the ribs and grooves slide out of engagement with each other. Such disconnection accidentally, is prevented, due to the fact that both shafts 6 are held against lateral shifting by their bearings, and these bearings must be loosened in order to permit the necessary disk shifting for disconnection.

As excellent results are obtainable from the details disclosed, they are preferably followed. However, within the scope of the invention as claimed, variations may be made.

I claim:—

1. A shaft coupling comprising two shaft-carried disks each having a dove-tail groove and an integral dove-tail rib at one side, said rib and groove being diametrically alined and each being of uniform width throughout its length; the rib of each disk being received in the groove of the other disk, whereby the two disks are separable upon relative movement of said disks in a diametrical direction.

2. A shaft coupling comprising two shaft-carried disks each having a stepped side disposing substantially half the area of said side in one plane and substantially the other half of said area in an outwardly spaced plane, the inner step of said side being provided with an integral radially disposed dove-tail rib, the outer step of said side being formed with a dove-tail groove alined with said rib, the outer face of the rib and the inner side of the groove being in a common plane; the rib of each disk being received in the groove of the other disk; the step-connecting portions of the two disks being disposed in abutting relation with each other.

In testimony whereof I have hereunto affixed my signature.

CHARLES E. HUBBARD.